United States Patent

Vodrahalli

Patent Number: 5,948,140
Date of Patent: Sep. 7, 1999

[54] METHOD AND SYSTEM FOR EXTRACTING AND REFINING GOLD FROM ORES

[75] Inventor: Nagesh K. Vodrahalli, Cupertino, Calif.

[73] Assignee: Paul L. Hickman, Los Altos Hills, Calif.; a part interest

[21] Appl. No.: 08/757,931

[22] Filed: Nov. 27, 1996

Related U.S. Application Data

[60] Provisional application No. 60/020,539, Jun. 25, 1996.

[51] Int. Cl.[6] .................................................. C22C 11/00
[52] U.S. Cl. ................................ 75/710; 75/745; 75/741; 75/744
[58] Field of Search ........................ 75/710, 745, 741, 75/744; 423/505, 38, 463, 34, 42

[56] References Cited

U.S. PATENT DOCUMENTS

| | | | |
|---|---|---|---|
| 3,957,505 | 5/1976 | Homick et al. | 75/108 |
| 3,957,603 | 5/1976 | Rhodes | 204/111 |
| 4,182,671 | 1/1980 | Squarcialupi | 204/276 |
| 4,494,986 | 1/1985 | Forsman | 75/109 |
| 4,612,093 | 9/1986 | Shor | 204/111 |
| 4,668,289 | 5/1987 | Langer et al. | 75/118 |
| 4,723,998 | 2/1988 | O'Neil | 75/191 R |
| 4,738,718 | 4/1988 | Bakshani et al. | 75/105 |
| 4,786,318 | 11/1988 | Owen et al. | 75/2 |
| 5,034,055 | 7/1991 | Rowson | 75/744 |
| 5,152,969 | 10/1992 | Kleid et al. | 423/29 |
| 5,162,105 | 11/1992 | Kleid et al. | 423/29 |
| 5,221,421 | 6/1993 | Leibovitz et al. | 156/642 |
| 5,401,296 | 3/1995 | Martenson et al. | 75/741 |
| 5,489,326 | 2/1996 | Thomas et al. | 75/744 |

Primary Examiner—Patrick Ryan
Assistant Examiner—M. Alexandra Elve
Attorney, Agent, or Firm—Hickman Stephens & Coleman

[57] ABSTRACT

A process and system and for extracting and refining gold from ores using relatively benign and inexpensive chemicals, fewer process steps, and permitting the recycling and re-use of process chemicals. The invention is preferably implemented as a two part process. In a first part process, gold is extracted from the ore and dissolved in a chemical solution to form a gold complex. The chemical solution preferably includes a KI and $I_2$. Optionally, Isopropyl alcohol is mixed with the KI and $I_2$ to serve as an accelerate. In a second part process, the complex is reduced to gold from the solution, preferably by one of two methods. The first method precipitates the gold complex by washing and decomposing of the gold complex to form pure gold. The second method electrolytically plates the gold from the gold complex solution onto a cathode to obtain pure gold.

21 Claims, 12 Drawing Sheets

METHOD AND SYSTEM FOR EXTRACTING AND REFINING GOLD FROM ORES

CROSS-REFERENCE TO RELATED APPLICATIONS

This patent application claims the benefit of copending U.S. provisional patent application No. 60/020,539, filed Jun. 25, 1996.

TECHNICAL FIELD

This invention relates to gold ore extraction and refining processes, and systems implementing such processes.

BACKGROUND ART

In far ancient times, the only source of gold was relatively pure elemental gold that was found in the form of nuggets and powder. Some thousands of years ago, however, it was discovered that gold could be extracted from ore by a process known as mercury amalgamation. This process was based upon the fact that gold particles wetted by mercury adhere to each other and to mercury coated copper plates. For many centuries, this process was the only method used for extracting from ores. While the percentage of gold recovered by a mercury amalgamation process varies with the type of ore, it is a relatively inefficient process leading to a considerable loss of gold.

The amalgamation process remained dominant until the 1890's, when cyanide processes gained favor due to the dangers of mercury amalgamation (i.e. slow death by mercury poisoning), the relative inefficiency of the amalgamation process, and the scarcity and high cost of the required mercury. The cyanide processes was first used in South Africa—the largest producer of gold in the world—and is still the main gold extraction process used to this day.

The cyanide process was a vast improvement over the amalgamation process in terms of safety, cost, and efficiency. In this process, the gold in finely ground ore is dissolved by treating it with a very dilute solution of sodium cyanide or the less expensive calcium cyanide plus lime and oxygen from air. The mixture is held for some hours in large tanks equipped with agitators. The chemical reaction yields a water solution of gold cyanide and sodium cyanoaurite. This solution of gold is treated to remove oxygen, and is then clarified and mixed with zinc dust to precipitate the gold and the other metals, such as silver and copper, that were dissolved by the cyanide. The precipitate is then treated with dilute sulfuric acid to dissolve residual zinc plus most of the copper. The residue is washed, dried, and melted with fluxes (materials used to promote fusion of the gold and silver and to dissolve the remaining copper). The operation may be repeated to flux off more base metal. The remaining gold and silver alloy, called doré, is then cast into molds for assay.

In FIG. 1, a prior art cyanide process 10 for extracting gold from ore begins with a step 12 of mining the ore. Next, in a step 14, the ore is ground to a sandlike consistency. In a step 16, a dilute mixture of NaCN, lime, and oxygen is added to the finally ground ore and is agitated in a large tank. This produces a water solution of gold cyanide and sodium cyanoaorite. The solution may also include silver and gold cyanides. Next, in a step 18, the oxygen is removed and a zinc dust is added to cause a precipitation of the gold from the solution. Along with the gold, silver and copper are also precipitated. In a step 20, $H_2SO_4$ is added to dissolve the zinc and copper. This produces an alloy known as doré, which is essentially an alloy of gold and silver. Doré can be up to about 96% pure gold, with the majority of the remainder being silver. Next, a purification process such as a Wohlwill process 22 or a Miller process 24 is used to create essentially pure gold. Both of these processes are well known to those skilled in the art. The Wohlwill process can create 99.95% pure gold, while the Miller process can create 99.5% gold purity. The Wohlwill process is an electrolytic process wherein essentially pure gold coats a cathode, and wherein impurities such as silver form chlorides and remain near the anode. Typically, Pt and Pd also dissolve in the electrolyte. In the Miller process, silver and other metals are converted to chlorides by passing chlorine though molten doré, and then are poured off or volatized. The Miller process creates a purity of only about 99.5%, since it is stopped before the gold converts into a chloride.

Cyanide processes have been well developed over the past century. However, these processes have a number of recognized deficiencies. For one, the use of cyanide is extremely hazardous and the resulting effluents are damaging to the environment. Further, it will be noted that the cyanide processes involve a large number of process steps, including a series of separations, alloying steps and final purification steps. These processes also involve the use of a number of chemicals, some of which are quite expensive, and a considerable expenditure of energy in the large number of process steps. The cyanides processes are therefore considered too expensive for use with low grade ores, and limit potential production due to the slowness and cost of the total process.

The standard gold extraction processes principally use dangerous and expensive chemicals like the cyanides, and have many steps resulting in a complex process. They also require extensive purification processes after extraction. It is therefore desirable to create a process that uses more benign chemicals and uses simpler processes, thus having the potential to reduce the overall cost of extracting and refining of gold.

In U.S. Pat. No. 5,221,421 of Leibovitz et al., a controlled etching process for performing fine-geometry conductive gold circuit lines on a substrate is disclosed for use in the electronics industry. Briefly, the disclosed invention is concerned with the production of fine geometry electronic circuitry by controlling the gold content in the liquid chemicals. This requires reducing the dissolved gold content in the liquid chemicals when the gold content begins to rise. Failure to reduce the gold content in the liquid chemicals will affect process control. The reduction in gold content in the liquid chemicals is achieved by recovering a dissolved gold complex compound ($AuI.KI_3$) from the liquid chemical, thereby restoring the liquid chemical for continuous etching of the fine geometry gold circuit lines. The recovered complex is further converted to AuI and subsequently to Au. Leibovitz et al. also propose to reduce the gold content in the liquid chemicals by removing gold electrolytically.

Therefore, the Leibovitz et al. process teaches the removal of gold from a liquid chemical solution to permit the liquid chemical solution to be reused. However, this process as disclosed for providing fine electronic circuitry is not suitable for the mass production of gold from gold ores in that it is a slow, controlled process used to maintain liquid chemical purity and not a fast, bulk process for economically producing large quantities of gold. Therefore, this slow controlled process used in the electronics industry would not appear to be applicable to a gold mining industry. This is due, in part, to the fact that for the Leibovitz et al. process to provide a commercially viable gold extraction and refinement method, its processes would need to be different and would need to be accelerated by at least an order of magnitude or more to be economically viable. In addition, substantial changes would have to be made to the Leibovitz et al. process in order to provide the ability for continuous or semi-continuous ore processing and extraction of gold from the liquid chemicals.

DISCLOSURE OF THE INVENTION

The present invention includes process and systems and for efficiently, rapidly, and safely extracting and refining gold from ores. The processes and systems have many advantages over the aforementioned cyanide extraction processes in that it uses more benign and less expensive chemicals, has many fewer process steps, and permits the recycling and re-use of its chemicals, thereby lowering the costs further and minimizing environmental damages.

The present invention is preferably implemented as a two part process. In a first part, gold is dissolved from the ore as a solution, and in the second part the gold is removed from the solution. Briefly, gold is extracted from the ore and dissolved in the chemical solution to form a gold complex. Next, the complex is reduced to gold from the solution, preferably by one of two methods. The first method precipitates the gold complex followed by filtering, washing and decomposing of the gold compound to form pure gold. The second method electrolytically plates the gold from the gold complex solution onto a cathode to obtain pure gold.

More particularly, the first part of the process begins with the mining of gold ore and the grinding of the ore to create fine particles. This finely ground ore is deposited in an agitator tank (also known as the "reaction chambers", "reaction vessels", "main vessels", and the like) with liquid chemical that is heated to an elevated temperature. Preferably, the liquid chemical (or "liquid", or "solution", or "etchant") is a KI-water solution with an addition of $I_2$, and with an optional addition of Isopropyl alcohol ("IPA"). The liquid chemical, agitation, and elevated temperature creates a gold complex in the liquid chemical solution which is extracted for further processing.

It is desirable to grind the ore as finely as possible to increase the amount of gold that can be extracted. For example, less gold will be extracted when the ore is ground to a 30–40 mesh (i.e. such that it can be sifted through a screen having 30–40 holes/inch) than when the ore has been ground to a 70–80 mesh. Ore grinding to a 30–40 mesh was common around the turn of the century, while 70–80 mesh is more common today. In the present invention, it is considered to be desirable to grind the ore to between a 120–325 mesh. The grinding can be a dry grinding process or a wet grinding process. Preferably, in the present invention, a wet grinding process is used where the liquid chemical is the grinding solution. In this way, the liquid chemical can begin to extract gold even as the ore is being ground. This liquid chemical, already including some gold, is then used in the regular extraction process as opposed to fresh liquid chemical.

The previously noted, further processing of the extracted solution can comprise of one of two methods. In a first or "precipitation" method, the gold complex solution is deposited in a cooling chamber at less than room temperature (about 20° C.) and, even more preferably, to about 2° C. This causes a black precipitate of $AuI.KI_3$ to form. This black precipitate is then filtered and washed with water to create yellowish precipitate of AuI. The yellowish precipitate is filtered and dried, and is thermally decomposed to create the gold. In an alternative second method, the gold complex solution is extracted, cooled if necessary, and water is added to create a precipitate of AuI. This precipitate is filtered, dried and then thermally decomposed into gold. During either of the described precipitation methods, the chemical used in the process can be recycled and reused. For example, the KI and the $I_2$ can be reclaimed and recycled.

In a second of "electrochemical" method, the gold complex solution is placed into an electro-extraction chamber at a temperature that is preferably at or below that of the reaction chambers. Next, one or more electro-extraction cells are immersed and activated in the liquid chemical and an electro-deposition begins. In this method, the gold forms on the cathodes of the cell. After the gold has been substantially electrochemically removed from the liquid chemical, the electro-extraction cells are removed and the cathodes are washed with water and filtered to obtain the gold.

The systems and apparatus of the present invention are designed to economically implement the above-described processes. A plurality of reaction chambers (e.g., 8 reaction chambers) can be used for continuous gold production. Since the method of the present invention is, essentially, a two part process, the system of the present invention preferably includes a first part processor which extracts the gold out of the ore to put it into a gold complex solution, and a second part processor which removes the gold from the gold complex solution.

A major advantage of the present invention is that it uses more benign and less expensive chemicals. The elimination of the cyanide used for cyanide processes and the mercury used in the amalgamation processes greatly improves operator safety and reduces environmental damage. Furthermore, the total chemicals used by the present invention tend to be less expensive than the total chemicals used in the aforementioned processes, and are well suited for recycling, again lowering costs and reducing potential environmental damage.

In addition, the process of the present invention has many fewer steps than the dominant cyanide extraction process of the prior art. This greatly lowers the cost of production and increases the through put of the gold extraction system.

These and other advantages of the present invention will become apparent upon reading the following detailed descriptions and studying the various figures of the drawings.

BEST MODES FOR CARRYING OUT THE INVENTION

Figure 1:
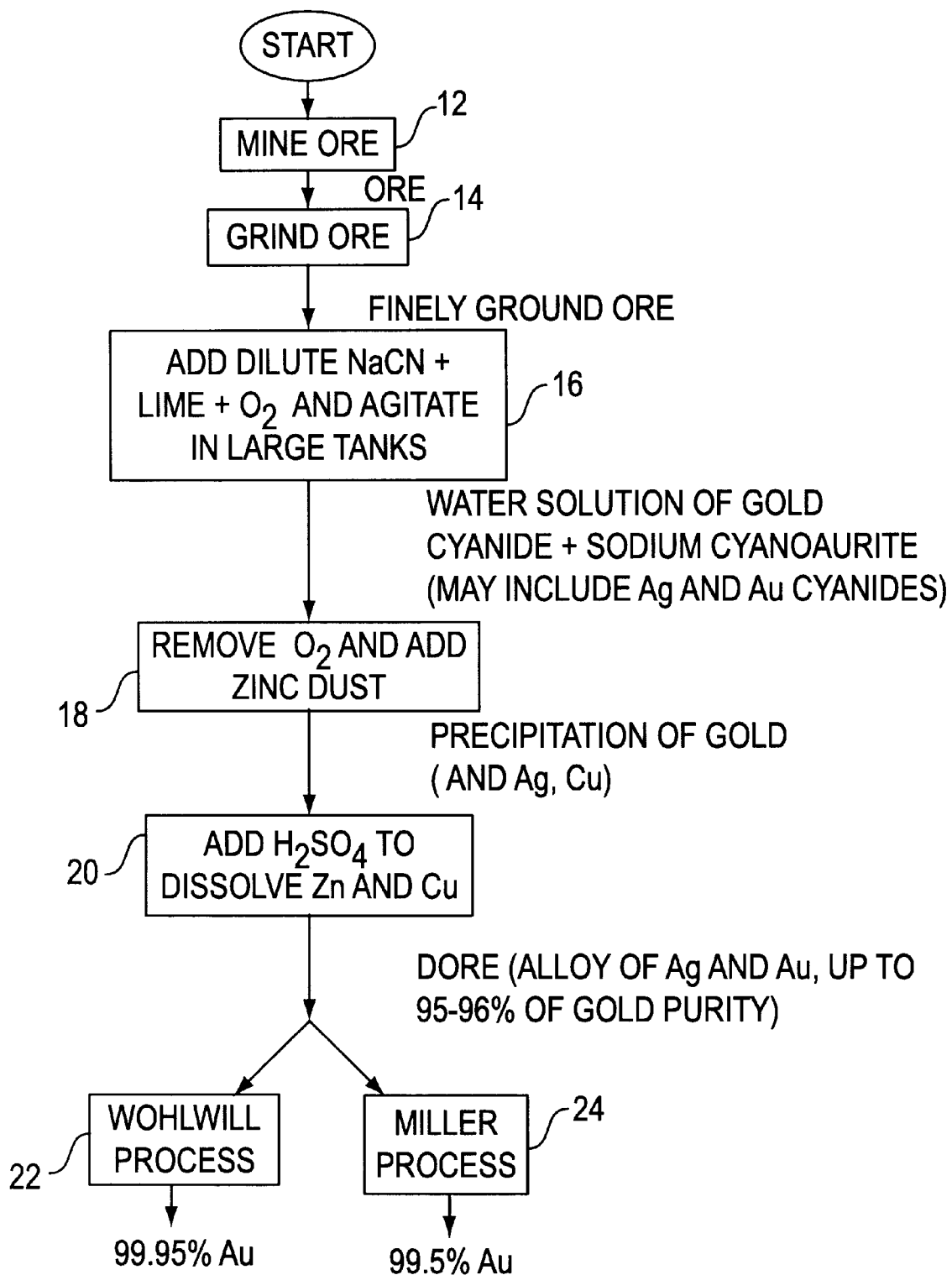
FIG. 1 is a flow-diagram of a prior art cyanide process for extracting gold from ore.
Figure 2:
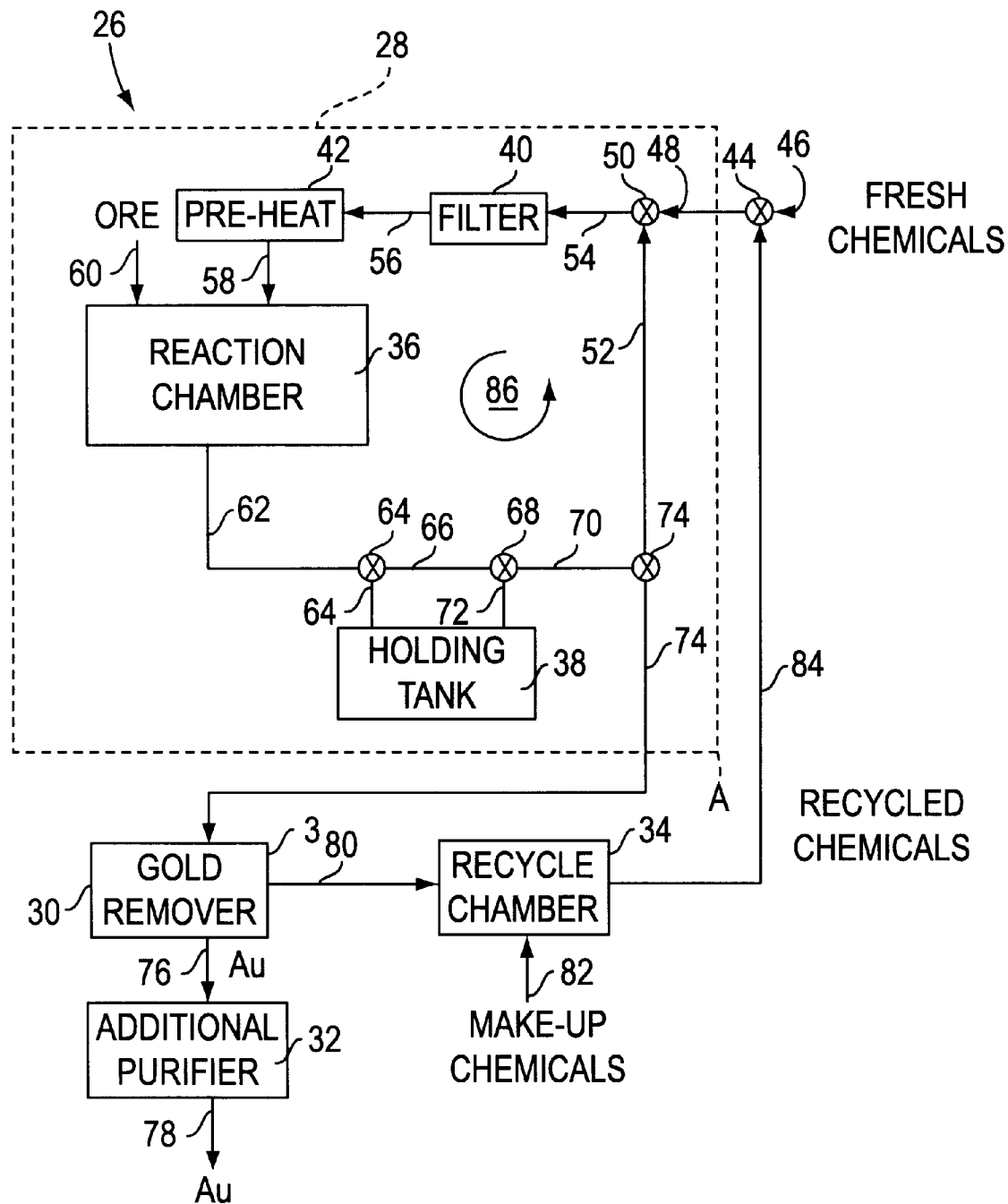
FIG. 2 is a block-diagram of a system in accordance with the present invention for extracting and refining gold from ore.

FIG. 1 is a flow-diagram of a prior art cyanide process for extracting gold as discussed above. In FIG. 2, system 26 in accordance with the present invention for extracting and refining gold from ore includes a first part processor 28 and a second part processor 30. The first part processor 28 implements a first process which creates a gold complex in a solution. As used herein "solution", "liquid", "liquid chemical", "etchant", and variants thereof may be used synonymously. The second part processor 30 removes the gold from the solution and refines ("purifies") the gold to a purified form. If necessary, an additional purifier 32 using one of the aforementioned prior art methods (e.g. the Wohlwill process or the Miller process) can further refine the gold. Preferably, a recycle chamber 34 is used to recycle the chemicals in the system 26. The chemistry of the two part process of the present invention has similarities to the chemistry and processes described in the aforementioned U.S. Pat. No. 5,221,421 of Leibovitz et al., the disclosure of which is incorporated herein by reference for all purposes.

The first part processor 28 preferably includes a reaction chamber 36, a holding tank 38, a filter 40, and a pre-heater 42. A valve 44 may be opened to allow fresh chemicals to enter an inlet 46 and/or to allow recycle chemicals to flow in through valve 44 into a pipe 48. A valve 50 allows chemicals to flow from either pipe 48 or a pipe 52 into a pipe 54 and through a filter 40. From there, the chemicals flow into a pipe 56 and through a pre-heater 42 before entering the reaction chamber 36 via pipe 58. Finely ground ore is also deposited in the reaction chamber 36 as indicated at 60.

The output of the reaction chamber flows through a pipe 62 to a valve 64 which can divert the fluid to either holding tank 38 via a-pipe 64 or to a pipe 66. A valve 68 allows either the fluid flow from pipe 66 to a pipe 70 or from the holding tank 38 through a pipe 72 to the pipe 70. A valve 74 allows the liquid to be diverted to either pipe 52 or to an output pipe 74.

The output pipe 74 is coupled to the gold remover 30 which produces gold as indicated at 76. While this gold can be quite pure, if additional refinement is desired, the additional purifier 32 can create even purer gold as indicated at 78. Optionally, chemicals extracted by the gold remover 30 can be pumped to a recycle chamber 34 via pipe 80 where it is mixed with "make up" chemical 82 in the recycle chamber. The recycle chemicals in a pipe 84 can be used instead of, or it can be mixed with the fresh chemicals flowing into the inlet 46 as determined by the position of the valve 44.

In operation, the system 26 is charged with fresh and/or recycle chemicals such that the reaction chamber is full and such that the various types of the first part processor 28 are full. Ore is then put into the reaction chamber 36 as indicated at 60, and the solution is pumped through the first part processor 28 by a pump (not shown) in the direction indicated at 86. That is, the solution is pumped from the reaction chamber 36 through pipes 62, 66, 70, 52, 54, filter 40, pipe 56, pre-heater 42, and pipe 58 back into the reaction chamber 36 on a preferably continuous basis. The solution preferably be pumped in this fashion for a number of hours (e.g., 4 hours) until most of the gold that is going to be extracted from the ore has been extracted from the ore. This can determined by a titration process wherein the rate of change of dissolved gold can be monitored, or by an in-line process (not shown) which automatically terminates the process when it is determined that enough gold has been extracted from the ore 60.

The holding tank 38 can be used for a variety of purposes. For example, the holding tank can hold the gold complex liquid when exchanging ore at the reaction chamber. Furthermore, the holding tank can hold water used for washing the ore before its exchange, since the wash water can also include gold. In addition, the holding tank allows the reaction chamber(s) to be emptied for maintenance. While a precipitation chamber could be used for this purpose, the liquid might not yet contain sufficient Au for precipitation, or the precipitation chamber already be in use at that time.

Once it is determined that there is sufficient gold complex in the solution a valve 74 causes a gold complex solution to flow through pipe 74 and into the gold remover 30. The gold remover 30 creates the gold 76 and, preferably recycles the chemicals through recycle chamber 34 to be used in the first part processor 28 again. The second part processor (gold remover) 30 can produce gold of high purity but, if even higher purity is desired, an additional purifier 32 can be used to produce highly purified gold 78.

Figure 3:
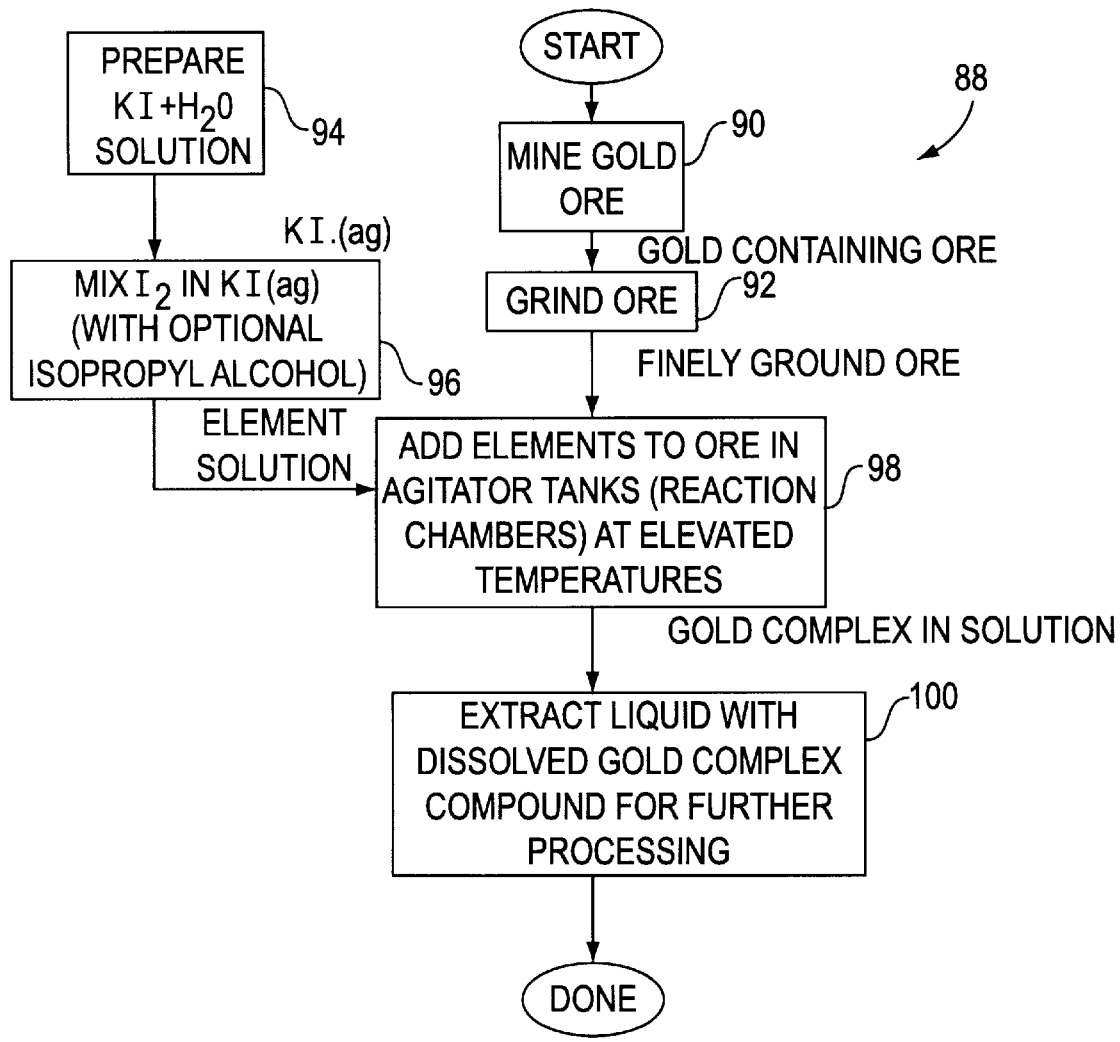
FIG. 3 is a flow-diagram of a first part process of the present invention.

FIG. 3 illustrates a process 88 implemented by the first part processor 28 of FIG. 2. The first part process 88 begins at 90 with a mining of the gold ore and with a step 92 where the ore is ground to the consistency between that of a coarse sand and small pebbles. In a step 94, a KI plus water solution is prepared and is mixed with $I_2$ in a step 96. Optionally, Isopropyl alcohol is mixed with the KI and the $I_2$ to serve as an accelerant. This mixture becomes the initial extraction solution. A step 98 adds the extraction solution to the ore in the agitator tank (i.e. the main reaction chamber) at elevated temperature. This causes the gold to be extracted from of the ore to become a part of a gold complex compound in the solution. Next, in a step 100, the liquid with dissolved gold complex compound is extracted for further processing and the process 88 is completed.

Figure 4:
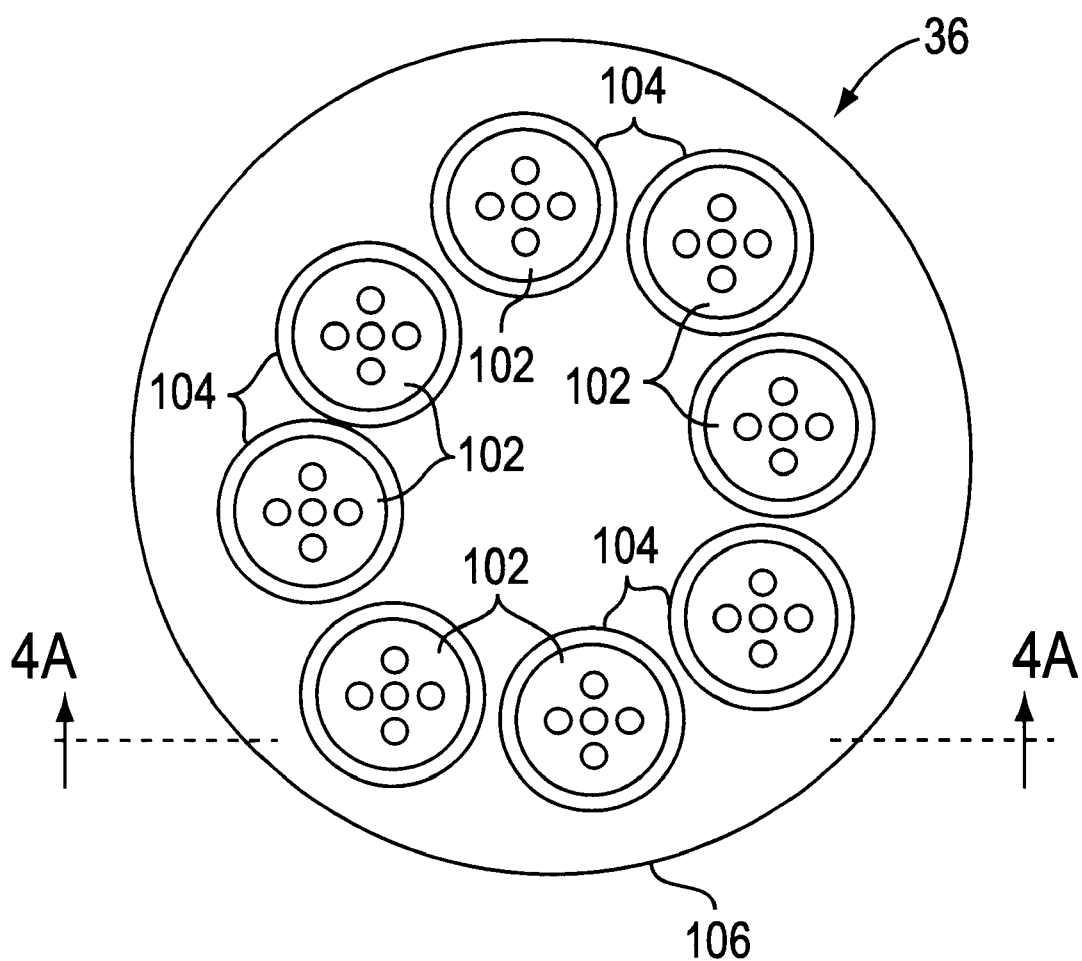
FIG. 4 is a top-elevational view of reaction chamber of FIG. 2.
Figure 4A:
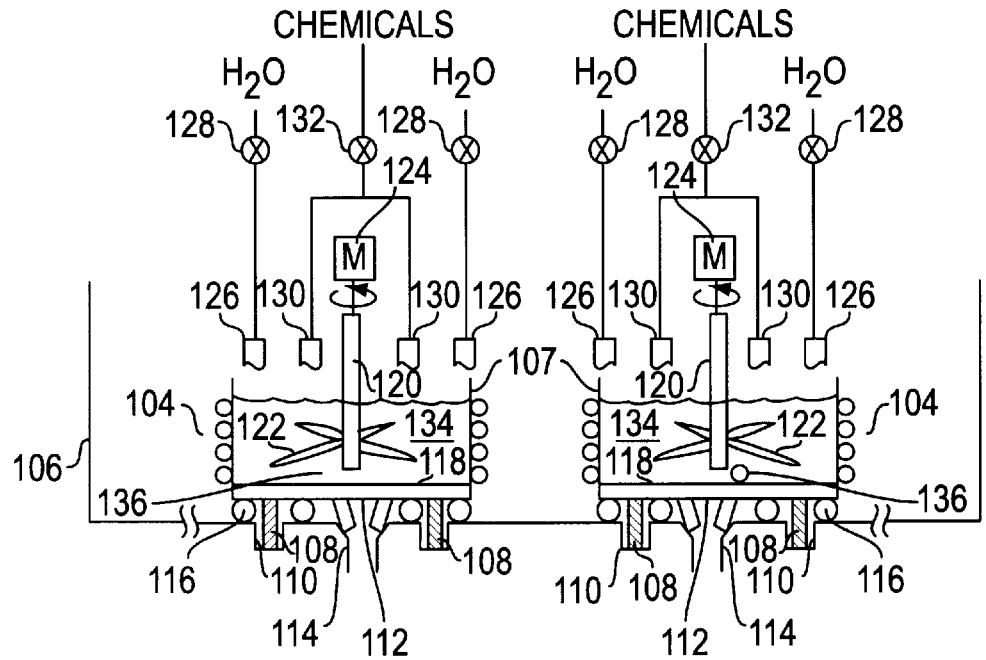
FIG. 4a is cross-sectional view taken along line 4a–4a of FIG. 4.

FIG. 4 is a top-plan view of reaction chamber 36 in accordance with the present invention. This particular embodiment of a reaction chamber is a multivessel embodiment including 8 reaction vessels 102. The reaction vessels 102 are enclosed in jackets 104 that are used for heating the contents of the vessels 102, and the reaction vessels 102 are also contained in a larger outer container 106 for containment purposes. Each of the vessels has an agitator, an liquid chemical inlet, a water inlet, and an ore inlet. The various components of the reaction chamber 36 can be seen in greater detail in the cross-sectional view of FIG. 4a.

The reaction vessels 102 are made from an inert, strong material such as steel or polyethylene-coated steel.

Alternatively, a composite material (such as other metals covered with plastic or metal covered with ceramic), or an entirely ceramic or plastic vessel can be used. Two preferred constructions for a reaction vessel are stainless steel (with a sidewall thickness of, for example, ¼"–½" in thickness) and stainless steel covered with polyethylene to a thickness of about 5–10 mils. The reaction vessel should be inert to KI, I, and Isopropyl alcohol. The jackets 104 are used to heat the contents of the reaction vessels 102 and can comprise electrical resistance coils, or fluid heating coils. Alternatively, the containment vessel can include a heated fluid for heating the contents of the reaction vessels, or use immersion heaters (not shown) immersed in the solution of the reaction vessels.

The reaction vessels are located within the containment vessel 106 and are supported pedestals 108. The outer container 106 can provide a rocking, vibrating, or shaking motion help agitate the solution within the reaction chamber 102. The pedestals fit within receptacles 110 of the container 106. Outlets 112 of the reaction vessels 102 are aligned with corresponding outlets 114 of the containment vessel 106. Gaskets 116 are made from an inert material and separate any bath liquid (e.g., hot water) that may be in the outer container 106, or any liquids that may have sloshed into the outer container 106, from the liquid chemical coming out of the outlet 112. A filter 118 is preferably used to filter the fluid flowing out of the outlet 112 to remove some of the ore sludge and larger particulates. The material of the separator filter 118 is preferably similar to the reaction vessel material and should be thick enough to support the ore and the liquid chemical mixture. Steel coated with polyethylene and other strong, inert materials are suitable for this purpose. Alternatively, a completely organic material (such as polyethylene) or a completely ceramic material (e.g. aluminum-oxide) can also be used to make the filter 118.

Associated with each reaction chamber is a mixer 120 which is also made from a suitable strong, inert material as mentioned above. The mixer has a number of blades 122 and is rotated by a motor 124. There are a number of water inlets 126 coupled to water sources by valves 128 and a number of chemical inlets 130 coupled to the chemical solution by valves 132. Preferably the water and chemical inlets take the form of spray heads so that the liquids can be quickly and evenly applied to the ground ore within the reaction vessels.

Temperature of the reaction chemicals in the reaction chamber(s) are preferably maintained at a controlled temperature between room temperature (e.g. 20–25° C.) and 100° C., with a preferred temperature of the reaction in the range of about 20–75° C. Below 20° C. the reaction rate is lower than at room temperatures, and achieving such lower temperatures typically requires an energy-inefficient cooling of the chemicals. Above 75° C., the loss of volatiles from the reaction chemicals and the attack on the container by the heated reaction chemicals becomes problematical. Therefore, for most economical operation the chemicals are maintained at about room temperature (typically 20–25° C.). However, for faster reaction rates, temperatures in the range of about 30–60° C. will provide a good compromise between reaction rate and the problems of heating the chemicals. A very good (and preferred) compromise is about 40° C. when stainless steel is used as the material of the reaction vessel, since this will accelerate the reaction rate without causing excessive corrosion of the stainless steel vessel by the heated chemicals.

The reaction vessel can be heated by a variety of methods. For example, the reaction vessel can be heated heating from outside using electro-resistive heating elements, or by hot liquid carrying heating coils, or by a liquid bath, or by immersion heaters inside the reaction chamber. The liquid chemicals are preferably pre-heated to the aforementioned controlled temperature, and the ores can optionally be pre-heated (especially if they are to be roasted, i.e. preheated in air). Insulation of the reaction chambers is preferably sufficient to keep the temperature of the reaction chamber high enough to carry out the reaction at a suitably high rate.

Agitation is preferred to intimately mix the ground ore with the chemicals to promote the reaction to occur to at a relatively fast pace, and to a desirable level of completeness. Agitation enhances the provision of fresh chemicals to the reaction interface between the ore surface and the liquid chemical solution. Agitation of large tanks is achieved by existing techniques known in the art of element extraction from ores. In the case of a large reaction vessel, the whole tank can be an agitation bed, and in the case of smaller reaction vessel approach, multiple reaction vessels can be placed on an agitation bed.

As noted, incoming chemicals are preferably preheated, filtered and brought into the reaction vessel through pipes again made of inert materials, which can be similar to the inert materials used in the reaction chamber(s). Insulating the pipes is advantageous to maintain the heated temperature of the incoming liquids. It is preferred that the chemical solution be sprayed onto the ore, again for the purpose of accommodating quick intermixing between the ore and chemicals to help in increasing reaction rates as well as to carry the reaction to completeness. Outgoing chemicals are preferably drawn out from the bottom, and gross filters can be provided to prevent the ores being carried out with the outgoing chemicals. Again, the gross filters are preferably made of the aforementioned inert materials. After the liquid solution is removed of the reaction vessel, a second filtration may optionally be used to remove particulates. The pipes carrying the liquid solution from the reaction chamber are preferably insulated and/or heated to minimize the rate of precipitation of gold complex on the walls of the outflow pipes.

In use, the ore is inserted into the reaction chambers 102 by a mechanism, not shown. Apparatus for loading and unloading ores are well known to those skilled in the art. The valve 132 is opened to permit the chemicals to flow into the reaction chamber 102 where they are heated by jacket 104, by hot water within chamber 106, or by another suitable heating method. Motor 124 causes the agitator 120 to rotate, thereby stirring the solution 134 within the vessel 102. Gold is extracted from the ore 136 into the solution 134 to form a gold complex solution which can flow into the filters 118 and out the outlets 112 and 114.

Figure 5:
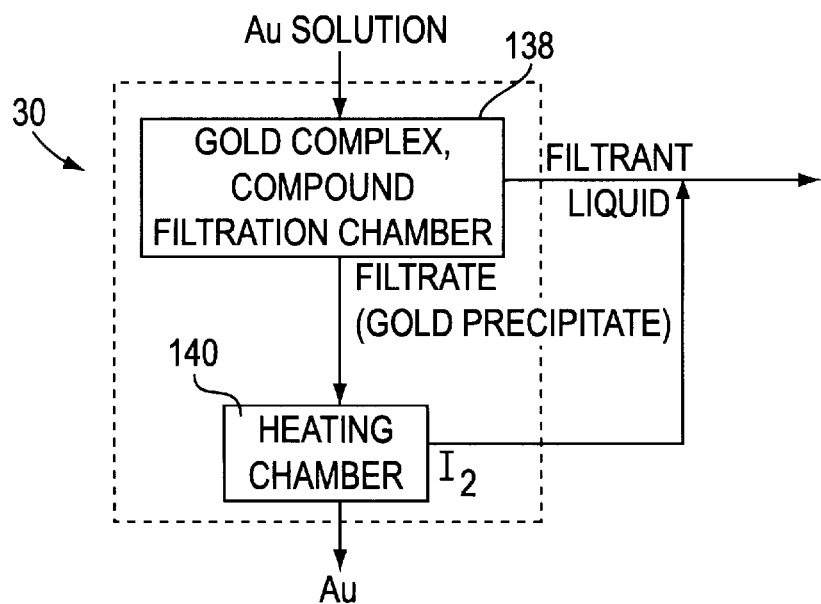
FIG. 5 is a block-diagram of a gold remover of FIG. 2.

In FIG. 5, a gold remover 30, in accordance with a first ("precipitation") method of the present invention includes a gold filtration chamber 138 and a heating chamber 140. The gold complex solution is entered into the gold filtration chamber 138 and filtrate (gold complex and/or gold compound) is removed from the gold filtration chamber. The filtrate liquid can be recycled as described previously. The filtrate is then inserted into the heating chamber 140 where it is decomposed into gold and $I_2$, which is also recycled as previously described.

Figure 6A:
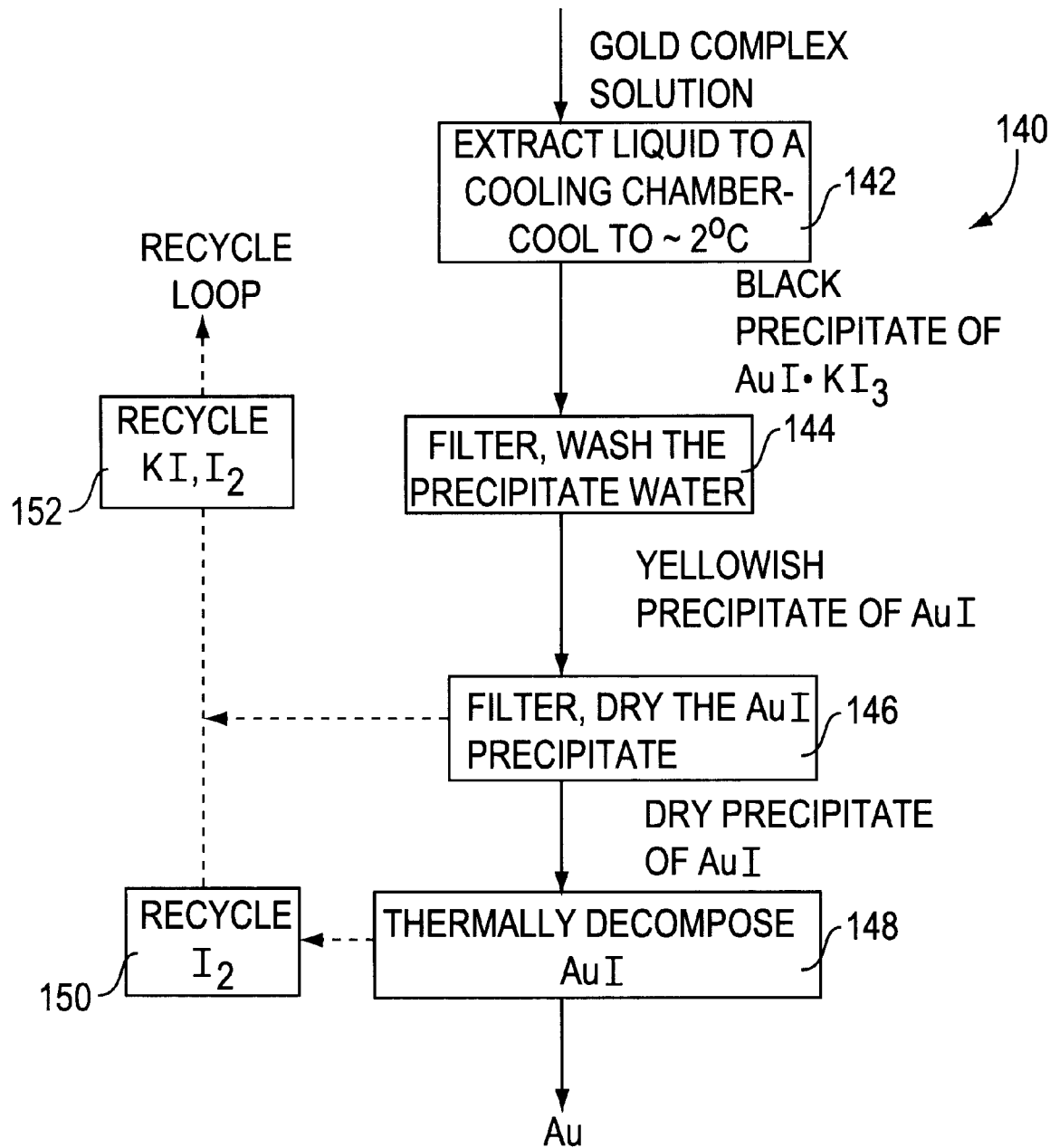
FIG. 6a is a flow-diagram of a first preferred method ("first precipitation method") for removing gold from solution implemented by the gold remover of FIG. 5.

There are several preferred methods that can be implemented by the gold remover 30 illustrated in FIG. 5. A preferred first method is shown in FIG. 6a. The process 140 begins at 142 with the extraction of the liquid from the gold complex solution into a cooling chamber to cool to approximately 2° C. The result of this cooling step is a black precipitate of AuI.KI$_3$. Next, in a step 144, this black precipitate is filtered, and washed with water. This produces a yellowish precipitate of AuI. Next, a step 146 filters and dries the AuI precipitate, and a step 148 thermally decomposes the AuI to create gold. This thermal decomposition removes at least the majority of non-gold (in most cases virtually all) of the halide component of the gold compound to leave a purified (e.g. >95% pure) metallic gold. As noted, the I$_2$ created by the thermal decomposition of the AuI can be recycled in a step 150 and other chemicals created from the filtering and drying step can also be recycled in a step 152.

Figure 6B:
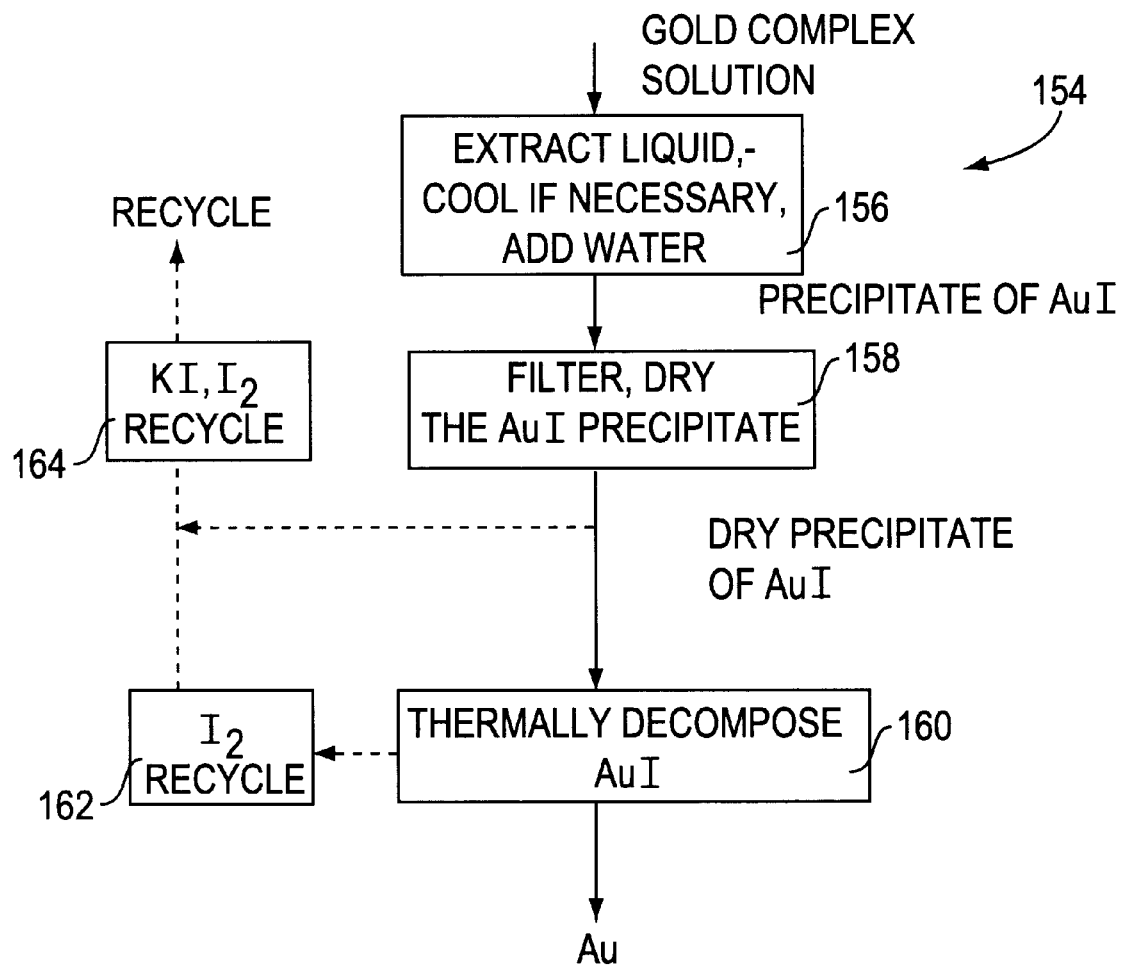
FIG. 6b is a flow diagram of an alternative first preferred method ("second precipitation method") for removing gold from solution implemented by the gold remover of FIG. 5.

In FIG. 6b, an alternative first method for the gold remover 30 of FIG. 5 begins at 156 with the extraction of the liquid of the gold complex solution. The solution is cooled if necessary, and water is added. This creates a precipitate of the AuI which is then filtered and dried in a step 158. The dried precipitate of AuI is then thermally decomposed into gold in a step 160. Optionally, a step 162 can recycle the I$_2$ from the step 160, and in a step 164 can recycle the KI+I$_2$ produced by the step 158.

Figure 7:
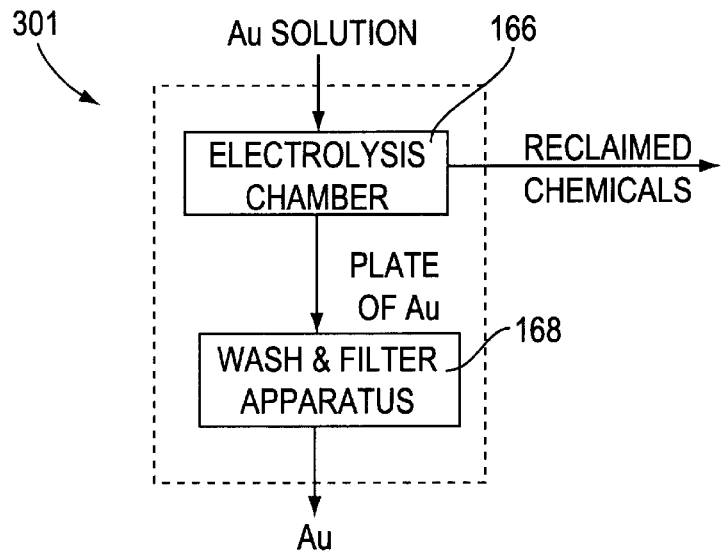
FIG. 7 is a block-diagram of an alternative gold remover of FIG. 2.

An alternative embodiment for a gold remover 30' of FIG. 2 is illustrated in FIG. 7. Instead of using a precipitation and filtering process, an electrolysis process is used. The alternative gold remover 30' includes an electrolysis chamber 166 and a wash and filter apparatus 168. The gold complex solution is placed into the electrolysis chamber 166 which produces a plated gold and, preferably, reclaims the chemicals of the solution for recycling and reuse. The plated gold washed and filtered in apparatus 168 to provide gold.

Figure 8:
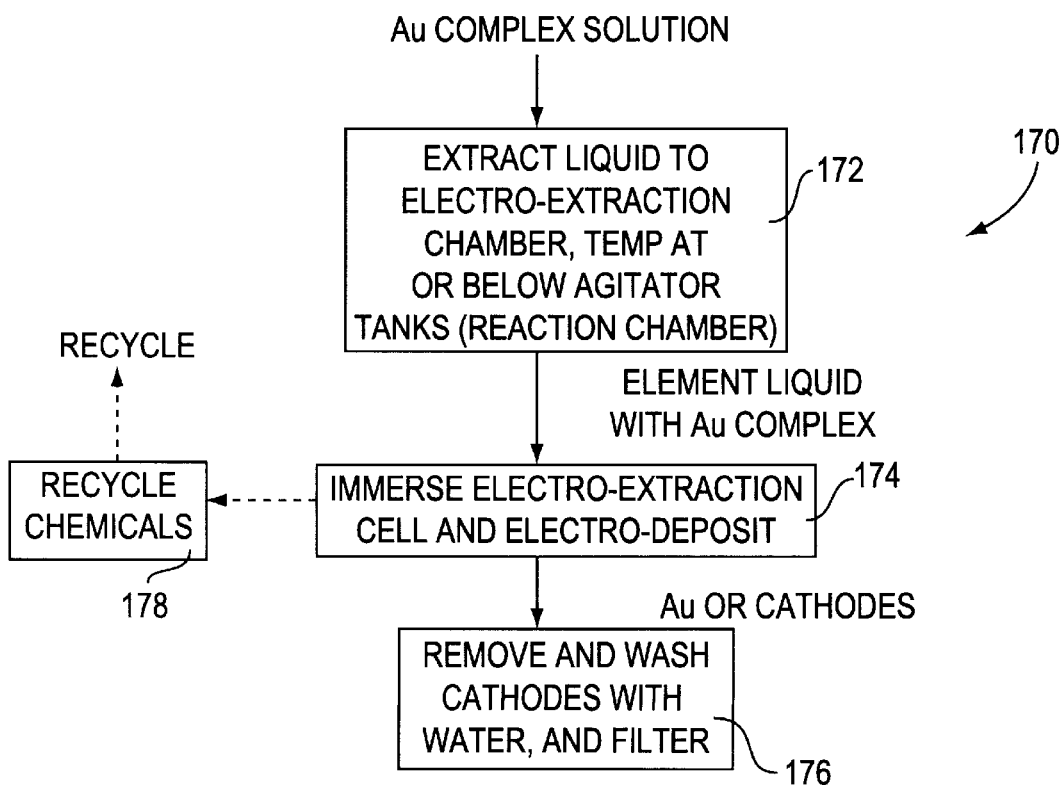
FIG. 8 is a flow-diagram of a second preferred method ("electrochemical method") for removing gold from solution implemented by the gold remover of FIG. 7.

A second ("electrochemical") process 170 implemented by the gold remover 30' or FIG. 7 is shown in FIG. 8. A step 172 extracts the liquid of the gold complex solution into an electro-extraction chamber having a temperature at or below that of the agitator tanks (i.e. the main reaction vessels). Next, the electro-extraction cells are deposited into the solution and gold is electro-deposited on the cathodes. Alternatively, the cells can already be in the reaction chambers, and the gold complex solution can be poured in around the cells, which are subsequently energized by a power source to initiate the gold deposition on the cathodes. Finally, in a step 176, the cathodes are removed and washed with water, and the precipitate is filtered to produce substantially pure gold. As an optional step 178, the chemical can be reclaimed and recycled.

Figure 9:
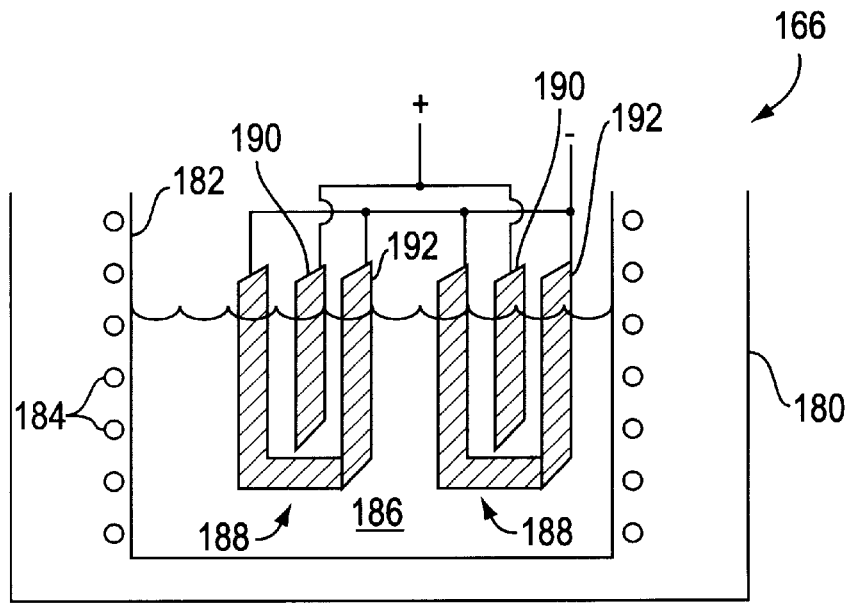
FIG. 9 is an illustration of electrolysis chamber of FIG. 7.

In FIG. 9, an electrolysis chamber 166 of FIG. 7 is illustrated in greater detail. While in this embodiment two electro-extraction cells are illustrated, it should be clear that more, and potentially many more, cells can be used to speed up the extraction process. The chamber 166 includes an outer chamber 180, a reaction vessel 182, a heater jacket 184, the gold complex solution 186, and one or more electro-extraction cells 188. Each of the electro-extraction cells 188 includes an anode 190 and a cathodes 192. When energized by a d.c. power source (not shown), preferably to about 3–5 volts d.c. and 20 amperes per liter of solution, the gold and the gold-complex solution 186 will be plated on the cathodes 192. A current density of about 0.1 A/cm$^2$ of cathode area is desired. The current is preferably carried by copper bus bars attached to the electrodes, as will be appreciated by those skilled in the art. It is preferable that the copper bus bars do not come into contact with the liquid chemical solution. After the rate of plating in a cathode is diminished, or after other suitable end point criteria, the cells 188 are removed and the cathodes 192 are washed to produce substantially pure gold.

A suitable set of electrode materials for the electro-extraction are as follows. The cathode can be any inert material with a film of gold (e.g. aluminum oxide ceramic substrate with gold film). A film of gold is preferred because it is compatible with the chemistry of the gold electro-deposition process. Alternatively, the cathode can be any inert material with an inert metal coating, although gold is preferred. For example, polyethylene coated with gold and stainless steel coated with gold are both suitable cathode constructions. A copper bus bar is preferably used to carry the current for the cathode, as noted above.

An anode can be of a plate configuration or of a wire mesh configuration (to reduce weight). For example, a suitable anode configuration includes a platinized titanium wire mesh with the aforementioned copper bus bars for carrying the electrical current. Platinum is preferred due to its relatively high inertness to the electro-chemical solution. Anode materials include platinized steel, plantinized niobium, platinized molybdenum, and platinized tantalum. A porous coating of a metal (preferably platinum) that is inert to the liquid chemical and with an appropriate electrode potential (e. g. an electrode potential similar to that of platinum) can be helpful to provide an increased surface area in order to keep low local current densities.

In general, cathode and anode configurations should be designed to have uniform current distribution, as is well known in the art of electro-deposition. For the cathode (the electrode on which the gold is deposited), uniform plates with a gold film with minimal or no sharp corners of the gold film are preferred. This is because, due to high current densities at sharp corners, the gold film can dissolve into the solution, partially reversing the desired gold deposition process.

With reference to the foregoing descriptions, several preferred processes in accordance with the present invention will be described. It will be appreciated by those skilled in the art that the described processes are illustrative of preferred embodiments of the present invention, and that there are a number of equivalents that will be apparent to those skilled in the art of the various processing steps, apparatus, systems, and materials that are within the spirit and scope of the present invention.

Gold Ore Extraction and Refinement Process Examples

The process begins with the mining of gold ore, which is produced in large quantities in, inter alia, South Africa, Russia, the United States of America, Canada, Australia, and other nations. The ore is then finely ground to between the consistency of coarse sand and fine pebbles in commercially available or custom made ore grinders. Ore mining and grinding processes are well known to those skilled in the art. Next, a solution of I$_2$+KI(aq) and preferably Isopropyl alcohol is added to the ore, or vice versa. Again, the loading and unloading of ores is well known to those skilled in the art. The solution is preferably made by dissolving commercially available KI crystals in water to make KI(aq), and then dissolving commercially available I$_2$ crystals in the KI(aq). Optionally, but preferably, Isopropyl alcohol is then added to the I$_2$+KI (aq) to serve as an accelerant. Other alcohols can also be used as accelerants. The Isopropyl alcohol can accelerate the gold dissolving process by 100%. One part Isopropyl alcohol (IPA) can be added to one part KI(aq) to create IPA.KI(aq). IPA increases the solubility of gold complex and hence increases the reaction rate a desirably rapid rate. It should be noted that since the IPA accelerates the process, it would not be a suitable addition for a controlled rate process. The reaction rate of the present invention can also be increased by increasing the flow rate of the solution through the ore.

The solution and ore should be mixed in a reaction vessel made of an inert material to the various chemicals of the process. For example, a polyethylene material, stainless steel, and composite materials made of ceramic or metal coated with a suitable plastic or inorganic coating (such as ceramic) can be used for constructing the reaction vessel. The reaction vessels require a material that can sustain repeated use, but is not attacked by the liquid chemicals. Smaller tanks, made of similar material can also be used. Depending on whether a large tank is used or small tank is used, the approaches of loading of fresh ore, and unloading of spent ore will be different, as appreciated by those skilled in the art. The chemical addition and removal, to a large extent may be similar but with modifications, as will be apparent to those skilled in the art.

Gold from the ore is dissolved by the chemicals and a gold complex is formed according to the following reaction:

$$2Au\ (metal) + [2I_2 + 2KI(aq)] \rightarrow 2AuI.KI_3(aq)$$

where the "." between the I and K refers to a weak bond, and "(aq)" refers to an aqueous solution.

At 40° C., about 20 grams of gold can be dissolved in one liter of the aqueous $KI/I_2$ solution (e.g. 166 grams of KI/liter of solution, and 80 grams of $I_2$/liter of solution) without IPA. With proper agitation, this can be achieved in less than 45 minutes. As noted above, the inclusion of IPA increases the solubility of the Au in the solution and also increase the rate at which it goes into solution. As the solution becomes saturated with gold, the gold extraction rate will decrease. Elevated temperatures greater than about 30° C. substantially increases the solubility as mentioned previously, and use of IPA while increases the reaction rate, and also positively affects the solubility. Reaction times for extracting gold from the ore is preferably several hours to ensure virtually all of the gold has been extracted from the ore. A preferred temperature range for the reaction is 30–60° C. as this will help extracting more gold per liter of the solution. For economic reasons, room temperatures in the region of 20–25° C. may be preferred.

Typically 3 tons of ore needs to be processed per ounce of gold, which is also about the amount of gold that one liter of liquid chemical can contain without loss of reactivity. As 3 tons of the ore require a large volume of liquid chemical, lower concentrations as described subsequently, are preferable. The same chemicals are preferably continuously circulated with fresh batches of ore till the chemical reaches a saturation point after which the gold complex can be precipitated at a lower temperature. This technique reduces the quantities of chemicals required. Also, after the gold is extracted from the liquid chemical, whether by the aforementioned precipitation or electrochemical methods, the chemicals are preferably be reclaimed and reused.

The liquid chemical (i.e. the gold complex solution) after it reaches a high enough gold concentration, is transferred into a precipitation chamber in the first methods, or to an electro-extraction chamber in the second method. It is necessary to transfer the solution to a chamber other than the main reaction chamber (vessel) in the first ("precipitation") methods because of the temperature differences in the two parts of the process, because the ore needs the addition of water, and because the first chamber contains the used ore (since it will be easier to separate liquid and a solid than to separate two solids). However, for the second ("electrochemical") method the process can be carried out in the main reaction vessel(s). Nonetheless, it is preferred that the electrochemical extraction be carried in separate chamber as it makes the monitoring and maintenance of the two part process (i.e. gold extraction from ore into solution, and the subsequent extraction of the gold from the liquid chemical) of the process separate, simple, and relatively clean.

With the first (precipitation) method, liquid chemical enters a low temperature chamber (preferably maintained at about 2° C.), and because of the solubility differences, the gold complex will precipitate out. Even though the low temperature chamber will be in the loop for the continuous operation, in practical terms it would be used as a batch operation since the solubility of gold in the liquid chemical is quite high in relative terms compared to the amount of gold in the ore. The liquid chemical is preferably continuously recycled through the main reaction chamber.

After the precipitation of gold complex, the liquid is filtered. The low temperature precipitation chamber can be also be fitted as a filtration chamber, or the precipitate can be transferred to a separate chamber for filtration.

Addition of water (which is preferably cold) will convert the gold complex $AuI.KI_3$ into AuI. This can be accomplished during the filtration process. Even more preferably, the cold water can be added to the aqueous liquid chemical solution contain the gold iodide-potassium iodide complex (black precipitate), to cause the gold iodide to precipitate into an insoluble compound even more readily. This helps in extracting the gold without having to wait for the saturation of the liquid chemical with gold complex, and provides an option for continuous flow operation of the extraction of the gold compound.

AuI (solid precipitate) thus collected can be readily converted to gold after drying and heating it to temperatures of about 140° C. to 150° C. to form relatively pure Au. $I_2$ is a byproduct and is fed back into the recycle loop. Gold can be further purified if necessary by prior art methods, e.g. the Wohlwill process or the Miller process. However, since these prior art methods are being applied to substantially pure gold, they will take place on a much smaller scale and with much less negative side effects than when they were applied to the extraction of gold from ore.

With the second (electrochemical) method, the gold is plated onto the cathodes of the cells. The plated material can be washed off of the cathodes with cold water at about 25° C., and then filtered and dried to provide substantially pure gold. The materials and construction of the electrodes are as previously discussed.

Another variation of the process transfers the gold etchant containing the $AuI.KI_3$ complex to a precipitation chamber (earlier described as a low temperature chamber), and water at a temperature of about 10–25 ° C. is added to cause the AuI to precipitate from the solution without the intermediate step of the $AuI.KI_3$ precipitation. In other words, room temperature or slightly below room temperature water can be used, meaning that the precipitation chamber can be at room temperature or slightly below room temperature. This saves the expense of providing and operating a refrigeration or cooling system for the precipitation chamber. AuI is insoluble in, and hence precipitates out, of the solution at these temperatures and can therefore be separated from the solution.

A further variation cools the liquid chemical solution to a lower temperature than the reaction temperature of the main vessel as it is removed from the main vessel. For example, the liquid chemical can be cooled to about room temperature. It is then mixed with chilled water at about the temperature of 10–25 ° C. and fed into a filtration chamber. Gold iodide precipitates and is and collects as filtrate on the filter. The liquid chemical is the preferably fed back to the recycle loop.

Figure 10:
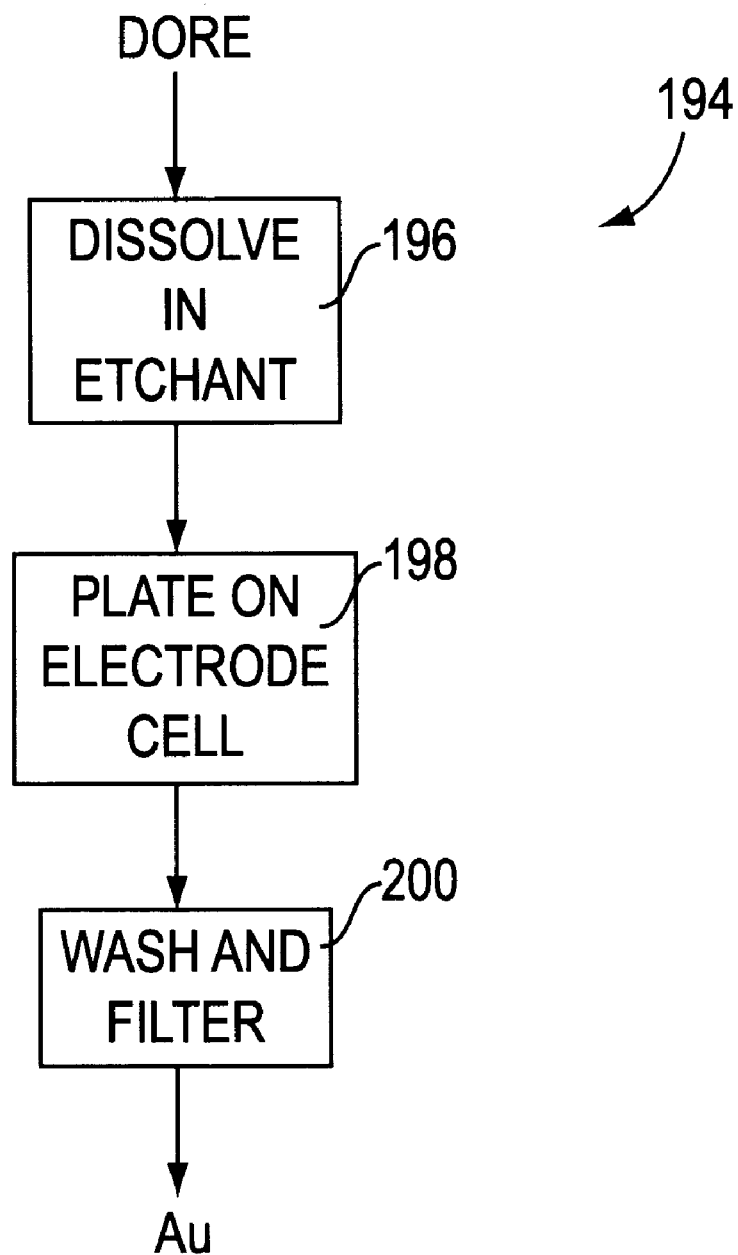
FIG. 10 is a flow-diagram of a process for purifying doré into gold in accordance with the present invention.

In FIG. 10, a process 194 for refining gold from doré is illustrated. In a first step 196, the doré is dissolved in an etchant which serves an electrolyte for an electro-extraction cell. A step 198 then causes the gold from solution to plate the electrode of the cell, and a step 200 washes and filters the precipitate from the plated cathode of the cell to produce pure gold.

Figure 11:
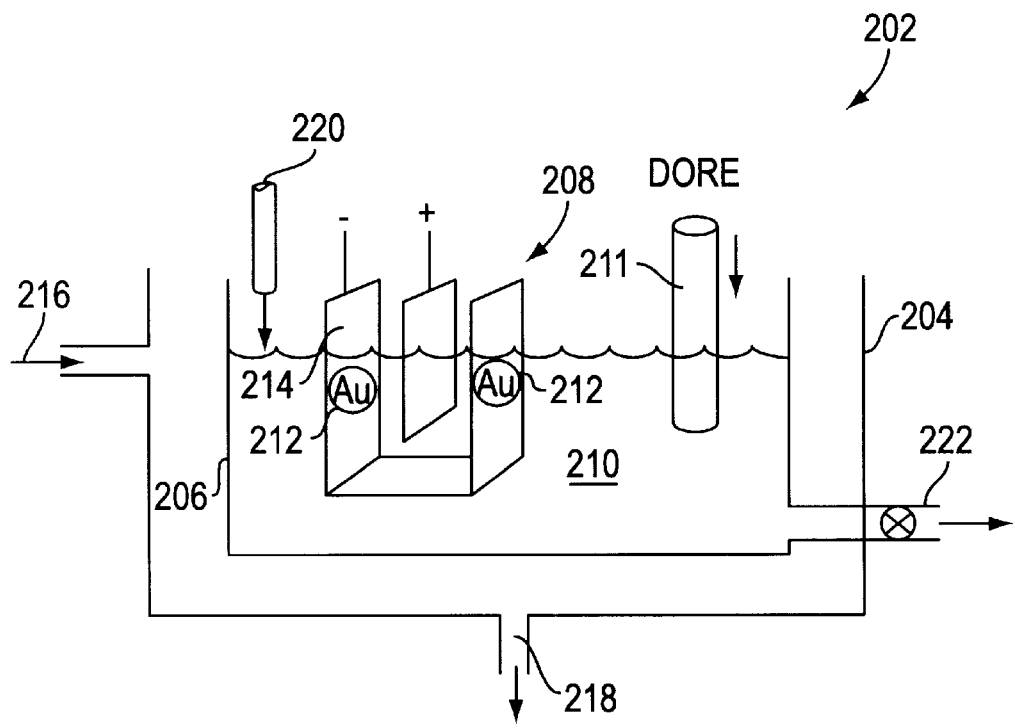
FIG. 11 is a cross-sectional view of a reaction chamber for converting doré into gold in accordance with the process of FIG. 10.

In FIG. 11, a system 202 for converting doré to gold includes a containment vessel 204, a reaction vessel 206, and an electro-extraction cell 208, and a solution 210. A rod of doré 211 is slowly dissolved in the etchant 210, which is preferably a $KI+I_2(aq)$ solution to create a the electrolyte. The cell 208 is coupled to a power supply of approximately 3–5 volts d.c. capable of providing 20 amperes/liter of solution to cause the gold 212 deposit ("plate") upon the electrode 214 of the cell 208. Preferably, hot water 216 is circulated between the containment vessel 204 and the reaction vessel 206 to maintain the temperature of the dore solution 210 at about 30–60° C. The water can flow out of an outlet 218. Likewise, fresh etchant solution can flow in an inlet 220 and out of an outlet 222 to provide fresh electrolyte solution. Again, the materials and construction of the electrodes are preferably as previously discussed.

Large Scale Batch Implementation

The amount of gold in ore is typically very small, e.g. in the order of an ounce to a few ounces per ton. This requires the processing of large quantities of ores to provide an economical process. The systems illustrated in FIGS. 12 and 13 will support such large-scale processing.

Figure 12:
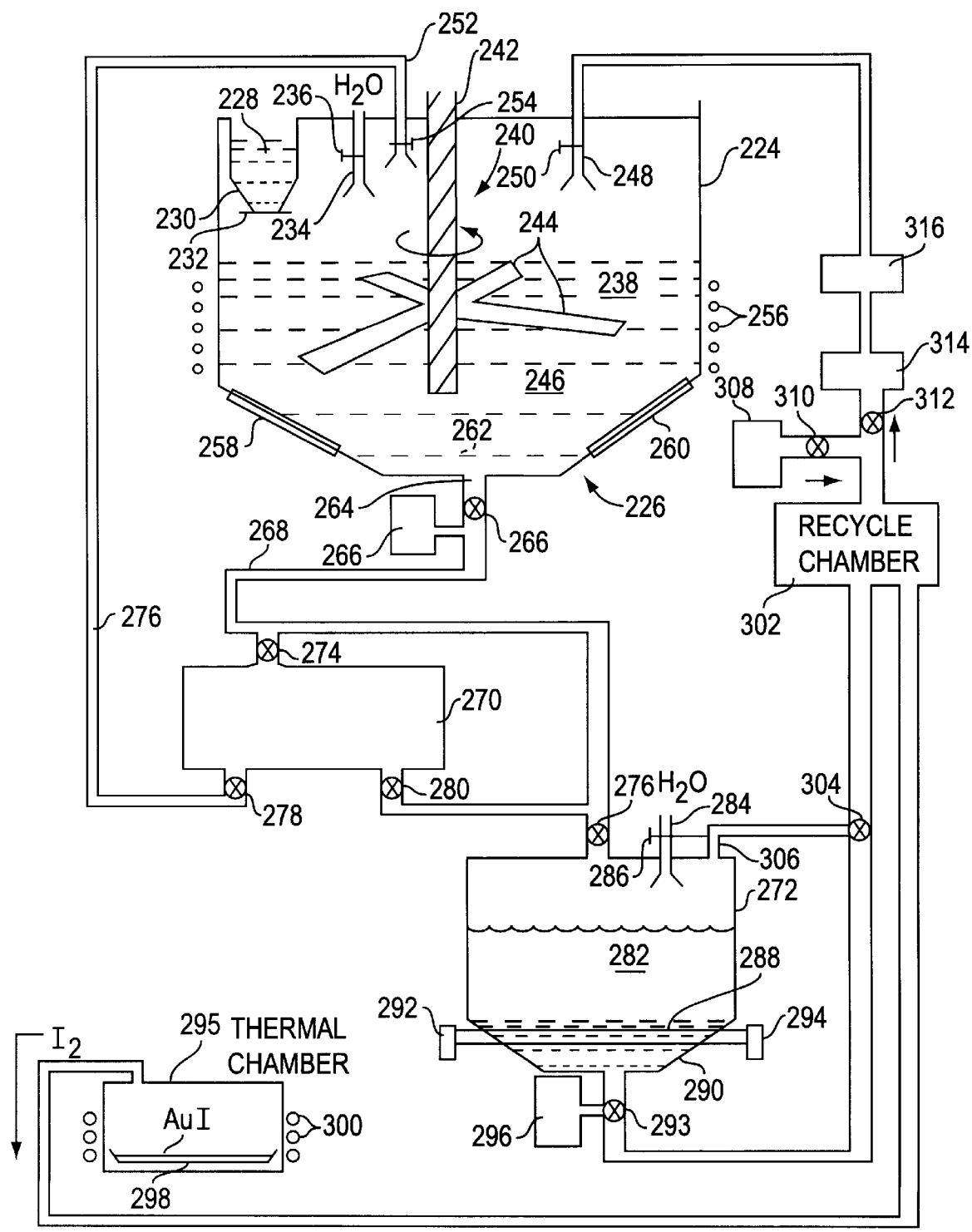
FIG. 12 is a block diagram of a large-scale gold extraction system in accordance with the present invention.

In FIG. 12, a large reaction chamber or tank 224 is provided for the extraction of gold from ore in accordance with the present invention. The tank 224 is preferably 40–50 feet in diameter and 10–20 feet in depth. The bottom 226 of the tank 224 takes the form of an inverted, truncated cone to aid in the removal of the ore after the gold has been extracted. Finely ground ore 228 is released into the tank 224 from a hopper 230 having a valve 232. As previously mentioned, the ore 228 is preferably ground to a mesh in the order of 25–325 mesh (i.e. 25 to 235 openings per linear inch), and can be accomplished by either dry or wet milling. If the ore 228 is ground by wet milling, it is preferable that the liquid chemical solution of the present invention be used for the wet milling process and then inserted into the tank 224 for further processing. While a finer particle size may help in increasing the reaction rates, it can also have the disadvantage of being slightly more expensive due to the grinding process. Therefore, in the present invention, ore is preferably ground between 25–80 mesh if cost is issue, and is ground between 80 and 325 mesh if reaction rate is the issue.

The tank 224 also has a water inlet 234 having a valve 236. The water provided from water inlet 234 serves various purposes. For one, the water can be used for an initial washing of the ore prior to the commencement of the gold removal process. Also, the water inlet can be used to provide water to wash the ore after it has been processed, thereby removing excess chemicals. Furthermore, the water can be provided at various temperatures to help maintain the proper temperature of the liquid chemical solution 238 within the tank 224. For example, if it is desired to elevate the temperature of the liquid solution 238, hot water can be inserted into the tank 224 through water inlet 234.

An optional mixer 240 includes a shaft 242 and blades 244. The mixer 240 is used to agitate the ore 246 and liquid chemical 238 within the tank 224. Alternatively, the entire tank 224 can be agitated, or the agitation process can be eliminated. Since agitation tends to increase the rate of the reaction, some form of agitation is considered to be desirable.

A liquid chemical inlet 248 is provided with a valve 250 to insert the liquid chemical into the tank 224. Preferably, 10–12 inches of the liquid chemical solution 238 stands above the surface of the ore 246 in the tank 224. A recycle inlet 252 is provided with a valve 254 to allow the liquid chemical, with dissolved gold, to be re-introduced into the tank 224 if it is determined that it is not yet at saturation.

The tank 224 is preferably heated, such as by coils 256. These coils can be coils of copper tubing carrying hot liquids or can be resistive coils that are electrically heated. The purpose of the coils 256 is to maintain the temperature of the solution 238 and ore 246 within the tank 224 at optimal processing temperatures.

A pair of doors 258 and 260 are provided to remove the spent ore from the tank 224. A stainless mesh screen 262 having a mesh substantially smaller than the particle size of the ore 246 is provided across the bottom of the tank 224. For example, the mesh of the stainless screen 262 is at least greater than 325 mesh, and is preferably about 400 mesh. The screen 262 prevents the ore from exiting an outlet 264 at the bottom of tank 224.

A valve 266 is coupled to the outlet 264 to release the solution after the gold has been extracted from the ore 246. This release from the tank 224 is assisted by a vacuum generator 266. Vacuum filtration systems are well-known to those skilled in the art. The vacuum generator creates a pressure differential which causes the solution to flow through the screen 262 and through a pipe 268, from which it will flow either into a holding tank 270 or a precipitation chamber or tank 272. If a valve 274 is open and a valve 276 is closed, the solution will flow into the holding tank 270, which preferably holds as much or slightly more liquid chemical fluid as is held by tank 224. In other words, in this FIG. 12, the holding tank 270 and the reaction chamber 224 are not to scale. The holding tank can hold the solution for later processing or, if it is determined that the solution is not fully saturated with gold, it can be recycled through pipe 376 and out the recycle inlet 252 into the tank 224 for further processing by opening the valve 278. Of course, pumps may be used to move the liquid as desired. Alternatively to using the holding tank, a valve 280 can be opened to allow the fluid to flow into the precipitation tank 272.

If the holding tank 270 is not used, the valve 276 is open and the solution flows directly from tank 224, through the pipe 268 and into the tank 272. A solution 282 in the tank 272 is, as previously described, a solution containing AuI and $AuI.KI_3$ complex. A water inlet 284 having a valve 286 allows water to be inserted into the precipitation tank 272. Preferably, this water is chilled or cold to less than 20° C. to aid in the precipitation process. Since AuI is insoluble in water, it will precipitate from solution as a precipitate 288 which will collect on a screen assembly shown generally at 290. Screen 290 is preferably a pair of screens 292 and 294 which can be removed separately. When a first of the screens 292 and 294 is removed to move the precipitate into a thermal chamber 295, the other screen can be used to collect the gold precipitate. Then, when that screen has been cleaned, it can be reinserted into the tank 272, and the other screen can be removed to move its precipitate to the thermal chamber 295.

Any $AuI.KI_3$ that may be in the precipitate 288 may be washed with water from water inlet 284 such that only substantially pure AuI remains on the screen assembly 290. The precipitate is removed from the screen assembly 290 as described above (i.e. sequentially removed from screens 292 and 294), and is then placed on a plate 298 within the thermal chamber 295. The thermal chamber is heated by coils 300 to drive off the iodine ($I_2$) which, along with the solution 282 from precipitation tank 272 is returned to a recycle chamber 302. The solution 282 may be drained from the tank 272 by opening valve 293, with assistance from vacuum assist 296. The solution 282 is tested prior to recycling to ensure that virtually all of the gold has been removed from solution. If not, a valve 304 causes the fluid to flow back into tank 272 through a recycle inlet 306 (with valve 276 closed).

The liquid within recycle chamber 302 is then analyzed to determine which chemicals need to be refreshed. Fresh chemicals are stored at 308 and, via valve assembly 310, are mixed with the output of the recycle chamber 302. Again, any necessary pumps for moving the liquids have been omitted to simplify the drawings. When additional liquid chemical is to be added to tank 224, the valve 250 and a valve 312 are opened to allow the liquid chemicals to flow through a filter 314 and pre-heater 316 to heat the solution to the desirable temperature.

Figure 13:
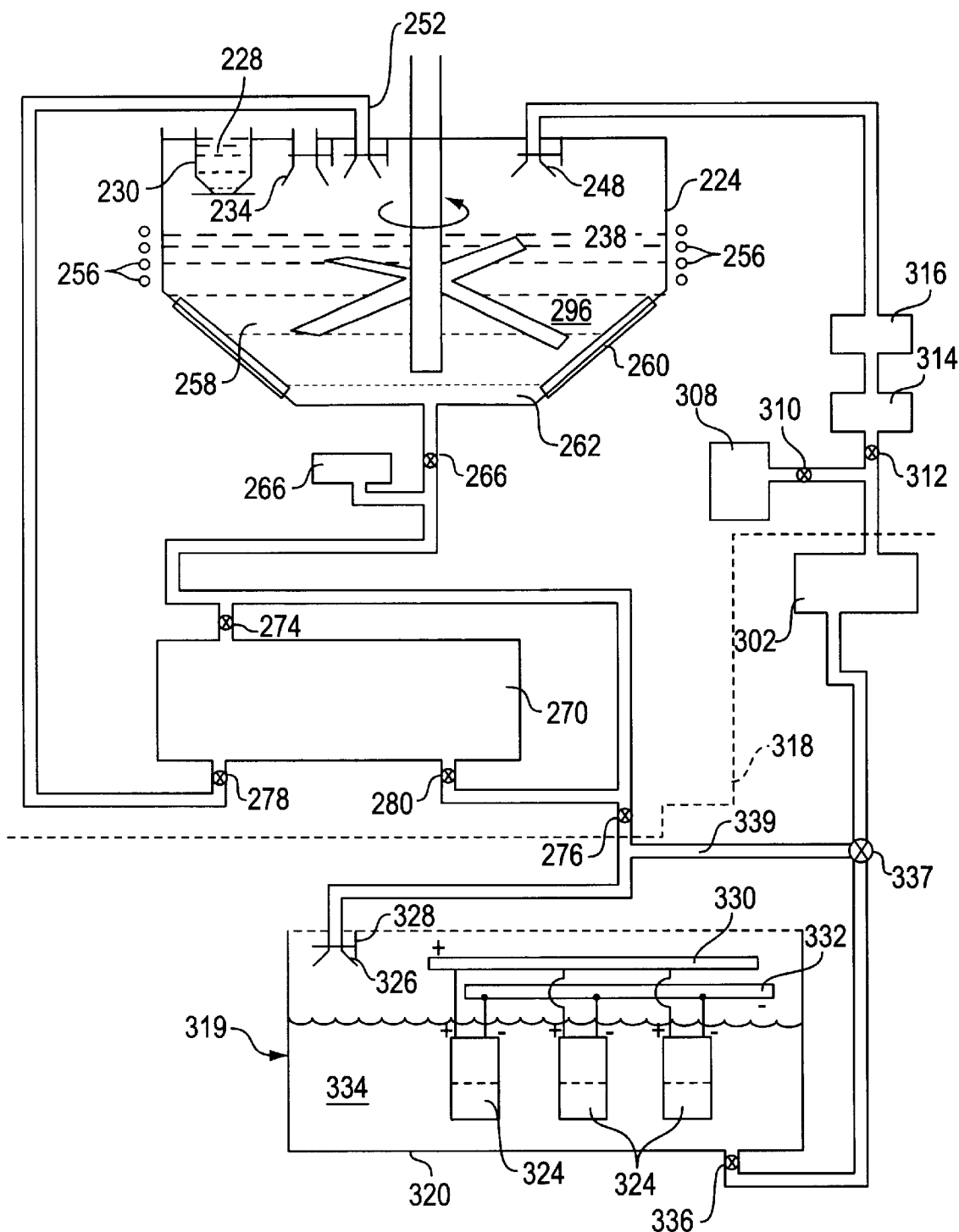
FIG. 13 is a block diagram of an alternate embodiment of a large-scale gold extraction system in accordance with the present invention.

In FIG. 13, a variant on the system of FIG. 12 is illustrated. In fact, the system of FIG. 13 that is above the line 318 is virtually identical to the system illustrated in FIG. 12 with like reference numerals referring to like numbers. Therefore, the description of the portion of the system of FIG. 13 above the line 318 will not be repeated for brevity.

In the lower portion of FIG. 13, an electro extraction chamber 319 includes a tank 320 and a number of electro extraction cells 324. The solution is released through an inlet 326 when a valve 328 is open and a voltage is applied between a positive or anode rail 330 and a negative or cathode rail 332. Once virtually all of the gold has been removed from the solution 334 within the tank 320, a valve 336 is opened to allow the fluid to be pumped to a recycle chamber 302' through a valve 337. Alternatively, valve 337 permits the chemicals to be recycled through the reaction chamber 319 through a pipe 339 to extract more gold. It should be noted, as it is well-known to those skilled in the art, that the current end voltage between the anode rail 330 and cathode rail 332 will control the deposition in the electro extraction cells 324. Therefore, the voltage and current should be controlled to cause only gold to be plated onto the cathode. Again, preferred construction and materials of the electrodes are as previously discussed. Platinum contamination is not a problem since it is not in solution with the chemicals of the present invention.

Process Optimization Parameters

The concentrations mentioned above are relatively high concentrations maximized to leach all the gold from the ore. Most ore has low gold content, e.g. as low as a few grams per ton of the ore (4 to 12 grams/ton). One liter of the $KI/I_2$ solution (e.g. 166 grams of KI/liter of solution, and 80 grams of $I_2$/liter of solution), can dissolve as much as 19 grams at 30° C., and about 16 grams/liter of the solution of above concentration at 20° C. (room temperature). In consequence, this concentration may be sufficient to dissolve the gold from about 1 to 3 tons of ore depending on the gold content of the ore. Of course, the amount of liquid chemicals required to dissolve the gold in one ton of the ore would be significantly larger. Therefore, the high concentrations described above, while being effective to extract the gold, would be excessive and somewhat expensive.

For a more economical process, weaker solutions can be used. This will not only reduce the cost of chemicals used, it will help in the precipitation aspects of the process by being able to reach saturation with earlier than concentrated solutions. As noted previously, the concentration of the liquid chemical is dependent on the concentration of gold in the ore. A preferred solution concentration is as follows: 1 liter of solution (166 grams of KI, 80 grams of $I_2$ in a liter of water) is diluted by adding additional 200 to 300 liters of water. This will provide a concentration of about 0.55 to 0.86 grams of KI/liter, and 0.3 to 0.4 grams of $I_2$/liter. This translates to approximately 0.25 kg to 1 kg/ton of ore depending on the density of the ore and the liquid required to adequately immerse the ground ore.

More particularly, a broad acceptable range of concentrations is 0.05–166 grams KI/liter of the solution and 0.03–80 grams $I_2$/liter of the solution. Any lower concentration may not extract a majority of the gold, and any higher concentration will slow the process. A more practical range of concentrations is 0.1–20 grams KI/liter of the solution and 0.06–10 grams of $I_2$/liter of the solution. Most preferably, the range of concentrations is 0.2–5 grams of KI/liter of the solution and 0.1–2.5 grams of $I_2$/liter of solution to optimize the trade-off between gold extraction efficiency and the speed of the process. As noted, the preferred solution concentration set out above is within this most preferred range.

Of course, the concentration of the $KI/I_2$ can be increased should it be necessary for intense leaching or should there be a higher grade ore. Also, as discussed previously, if a concentrated solution is used, it will facilitate a continuous liquid flow process as sequential batches of ores are loaded, leached, and unloaded. A concentrated solution will allow several batches of ores to be leached in a continuous fashion until the liquid reaches a near saturation point to facilitate precipitation in the next step of the process. Lower concentrations, such as those suggested above, are adequate to leach the gold, will provide easier precipitation.

As mentioned previously, the reaction occurs at a fast pace at elevated temperatures (e.g. 30° to 60° C.). Since the solubility of the gold is directly related to the temperature of the reaction, when the liquid solution is cooled, the excess gold is precipitated from solution in the form of a gold complex. Of course, this method requires the extraction of the gold from the ground ore at an elevated temperature in a first vessel, and the subsequent recovering of the gold from the solution at a lower temperature in a second vessel.

An alternative method which trades lower cost for somewhat lower gold extraction efficiency is as follows. In this alternative method, the gold is extracted at room temperature rather than at >25° C., as in the previous example at a substantial savings in energy costs. Since the gold concentration in the ore is typically small, the incremental benefit of a slightly higher reaction rate at elevated temperatures is not terribly significant. Therefore, with a slight decrease in efficiency, the process can be performed at room temperatures. Besides lowering energy costs, less expensive reaction vessels (such as stainless steel tanks) can be used, since the liquid chemicals are less reactive to the materials of the vessels at room temperature.

Preferred Gold Extraction Processes

It should be noted that the processes of the present invention are designed to remove interstitial gold from ground gold ore. The extraction of the gold begins very quickly after the initial contact of the liquid chemical with the interstitial gold of the ore.

The primary active ingredient in the liquid chemicals is dissolved $I_2$ which functions as a powerful oxidant in the aqueous KI solution. Gold oxidation proceeds in accordance with the following reaction sequence:

$$2AU_{(metal)} + I_{2(aq.)} \rightarrow 2AuI_{(aq.)} \qquad \text{(Equation 1)}$$

Both $I_2$ and AuI are insoluble in water, but soluble in aqueous solutions of KI by forming complex compounds. The complexing reactions may be written as follows:

$$I_2(\text{solid}) + KI_{(aq.)} \rightarrow KI_{3(aq.)} \qquad \text{(Equation 2)}$$

$$AuI_{(solid)} + KI_{3(aq.)} \rightarrow AuI.KI_{3(aq.)} \qquad \text{(Equation 3)}$$

$$2Au_{(metal)} \rightarrow 2Au^{+}_{(aq.)} + 2e^{-} \qquad \text{(Equation 4)}$$

$$I_{2(aq.)} + 2e^{-} \rightarrow 2I^{-}_{(aq.)} \qquad \text{(Equation 5)}$$

Equation 4 represents the anodic oxidation of the gold metal, and equation 5 represents the cathodic reduction of the $I_{2(aq.)}$. The sum of equations 4 and 5 yields equation 1, i.e. the gold extraction process.

For the reaction of equation 1 to proceed, the equilibrium electrode potential [E(c)] of reaction of equation 5 must be higher than (i.e., positive relative to) the electrode potential [E(a)] of the reaction of equation 4 as follows:

$$E(c) - E(a) > 0 \qquad \text{(Equation 6)}$$

The terms E(c) and E(a) are well known to those skilled in the art of electrochemistry. For condition (6) to be satisfied, the molar concentration of $Au^+$ ions must be less than $5 \times 10^{-19}$. Accordingly, for the extraction process to proceed in an efficient manner, it is necessary to complex the $Au^+$ ions in order to maintain the concentration limit thereof in the liquid chemical solution below the requisite limit described above. This requirement is satisfied by complexation with, for example, $KI_{3(aq.)}$. The electrochemical reaction summarizing this process is as follows:

$$2Au_{(metal)} + 2KI_{3(aq.)} + 2I^{-}_{(aq.)} \rightarrow 2AuI.KI_{3(aq.)} + 2e^{-} \qquad \text{(Equation 7)}$$

Similarly, the cathodic process including the complexed iodine is as follows:

$$2KI_{3(aq.)} + 2e^{-} \rightarrow KI_{(aq.)} + 2I^{-}_{(aq.)} \qquad \text{(Equation 8)}$$

Accordingly, the entire extraction process is represented by the sum of the reactions of equations 7 and 8 is as in the following Equation 9:

$$2AU_{(metal)} + 3KI_{3(aq.)} \rightarrow KI_{(aq.)} + 2AuI.KI_{3(aq.)} \qquad \text{(Equation 9)}$$

Thus, as the extraction proceeds, a liquid product consisting of the unreacted liquid chemical ($I_2$ and KI) and a dissolved gold reaction complex (2AuI.KI3) is formed. The 2AuI.KI3 provides AuI and KI+$I_2$ in the presence of water. The AuI can then be processed as described above to obtain gold and iodine.

Alternative Gold Extraction Processes

The potassium iodide/iodine chemistry as set forth above is currently believed to be the best mode for practicing the invention. However, there are several alternative chemistries that produce similar results and which can be considered, in many respects, equivalents to the potassium iodide/iodine chemistry.

For example, sodium iodide/iodine, calcium iodide/iodine can be substituted for, or used in conjunction with, the potassium iodide/iodine chemistries as set forth above. As will be appreciated by those skilled in the art, sodium iodide/iodine and calcium iodide/iodine chemical reactions will be quite similar to the potassiumiodide/iodine chemical reactions as set forth above. However, potassium iodide/iodine is currently preferred as it is readily available and its chemistry is very well understood.

Another alternative or enhancement for potassium iodide/iodine chemistry is the use of potassium, sodium, or calcium bromides/bromines. In addition, chloride/chlorine chemistries can be used (i.e. potassium, sodium, or calcium chloride/chlorine), as will be appreciated by those skilled in the art. The chlorine, being a gas at room temperatures, will be bubbled through the liquid during the extraction of gold. The chemistries of all of these alternatives will be similar to that described above with respect to potassium iodide/iodine. Again, the iodide/iodine chemistry is currently preferred because bromides/bromines are less common than iodides/iodines, and therefore somewhat more expensive, and because the handling of the chlorines is difficult and potentially hazardous.

Therefore, it is clear that the present invention is a chemical solution including at least two species of chemicals, where a first species is an alkali/alkaline halide, and where a second species is the corresponding halide, in an aqueous solution. By contacting the chemical solution with ground gold ore, at least some of the interstitial gold forms a gold compound of the hologen, from which the metallic gold is ultimately derived. This gold compound is usually a part of the aforementioned gold complex, the other part including a halide.

It is therefore apparent that the first species is selected from the group consisting essentially of potassium, sodium, barium, and calcium, and that the halide is selected from the group consisting essentially of iodide, bromide, and chloride. It is also apparent that the second species is selected from the group consisting essentially of iodine, bromine, and chlorine.

Preferred Electrochemical Extraction Processes

A preferred electrochemical extraction process (see, for example, FIGS. 9 and 13 with associated descriptions) is as follows. At the cathode, the reaction is:

$$2AuI.KI_{3(aq.)} + 2e^{-} \rightarrow 2Au_{(metal)} + 2I^{-}_{(aq.)} + 2KI_{3(aq.)} \qquad \text{(Equation 10)}$$

At the anode, the reaction is:

$$KI_{(aq.)} + 2I^{-}_{(aq.)} \rightarrow KI_{3(aq.)} + 2e^{-} \qquad \text{(Equation 11)}$$

By combining Equations 10 and 11 yields the reaction of Equation 12, below:

$$2AuI.KI_{3(aq.)} + KI_{(aq.)} \rightarrow 2Au_{(metal)} + 3KI_{3(aq.)} \qquad \text{(Equation 12)}$$

Thus pure gold is removed from the liquid chemical and coated onto the cathode. As the gold is coated on the cathode, there is a chemical regeneration of the liquid chemical, i.e. the KI3 (which is KI and $I_2$) is being regenerated and can be subsequently reused. The gold is removed from the cathode by removing it from the electrochemical cell and washing the cathode with cold water.

Gold Products

After the gold has been extracted and refined, it may be fashioned into ingots or other suitable forms. The gold may be alloyed with other metals, and fashioned into a number of articles of manufacture, including jewelry. The gold may also be used in its purified form for commercial and scientific purposes, or fashioned into other forms for use as coinage, bullion, etc. The alloying and fashioning of gold and gold alloys into a number of forms and products are well known to those skilled in the art.

While this invention has been described in terms of several preferred embodiments, there are alterations, permutations, and equivalents which fall within the scope of this invention. It should also be noted that there are may alternative ways of implementing the process, methods, systems and apparatus of the present invention. It is therefore intended that the following appended claims be interpreted as including all such alterations, permutations, and equivalents as fall within the true spirit and scope of the present invention.

I claim:

1. A method for extracting gold from ore comprising:

contacting ground ore having interstitial gold with a chemical solution including at least two species of chemicals, where a first species is an alkali/alkaline halide where said alkali/alkaline portion of said first species is selected from the group consisting essentially of potassium, sodium, barium, and calcium, and wherein said halide portion of said first species is selected from the group consisting essentially of iodide, bromide, and chloride, and where a second species is the corresponding halide where said corresponding halide is selected from the group consisting essentially of iodine, bromine, and chlorine, in an aqueous solution, thereby causing at least some of said interstitial gold to form a gold complex of the halogen, said gold complex including a gold compound and said halide; and deriving metallic gold from said gold complex by precipitating said gold complex by cooling said chemical solution to create a gold complex precipitate;

removing at least the majority of the halide of said precipitate by adding water to said chemical solution to produce a gold compound; and converting said gold compound to said metallic gold by decomposing said gold compound at elevated temperatures.

2. A method for extracting gold as recited in claim 1 wherein said chemical solution used to form said gold complex is at a temperature of between about 20 and 100 degrees Celsius.

3. A method for extracting gold as recited in claim 2 wherein said chemical solution used to form said gold complex is at a temperature of between about 30 and 60 degrees Celsius.

4. A method for extracting gold as recited in claim 1 wherein said first species is potassium iodide (KI), and said second species is iodine ($I_2$).

5. A method for extracting gold as recited in claim 4 wherein the concentrations of KI and $I_2$ per liter of solution are 0.05–166 grams for KI and 0.03–80 grams for $I_2$.

6. A method for extracting gold as recited in claim 5 wherein the concentrations of KI and $I_2$ per liter of solution are 0.1–20 grams for KI and 0.06–10 grams for $I_2$.

7. A method for extracting gold as recited in claim 6 wherein the concentrations of KI and $I_2$ per liter of solution are 0.2–5 grams for KI and 0.1–2.5 grams for $I_2$.

8. A method for extracting gold as recited in claim 7 wherein the concentrations of KI and $I_2$ per liter of solution are 0.55–0.86 grams for KI and 0.3–0.4 grams for $I_2$.

9. A method for extracting gold as recited in claim 1 further comprising filtering the precipitate prior to removing said at least majority of the halide.

10. A method for extracting gold as recited in claim 1 wherein said chemical solution is cooled to less than about 20 degrees Celsius.

11. A method for extracting gold as recited in claim 1, further comprising grinding said ore in the range of about 25 to 325 mesh.

12. A method for extracting gold as recited in claim 1, further comprising forming said metallic gold into a gold product.

13. A method for extracting gold from ore comprising:

contacting ground ore having interstitial gold with a chemical solution including at least two species of chemicals, where a first species is an alkali/alkaline halide where said alkali/alkaline portion of said first species is selected from the group consisting essentially of potassium, sodium, barium, and calcium, and wherein said halide portion of said first species is selected from the group consisting essentially of iodide, bromide, and chloride, and where a second species is the corresponding halide where said corresponding halide is selected from the group consisting essentially of iodine, bromine, and chlorine, in an aqueous solution, thereby causing at least some of said interstitial gold to form a gold complex of the halogen, said gold complex including a gold compound and said halide; and deriving metallic gold from said gold complex by electrochemically depositing gold on a cathode from said chemical solution containing said gold complex.

14. A method for extracting gold as recited in claim 13 wherein said chemical solution is at a temperature of between about 20 and 100 degrees Celsius.

15. A method for extracting gold as recited in claim 14 wherein said chemical solution is at a temperature of between about 30 and 60 degrees Celsius.

16. A method for extracting gold as recited in claim 13 wherein said first species is potassium iodide (KI), and said second species is iodine ($I_2$).

17. A method for extracting gold as recited in claim 16 wherein the concentrations of KI and $I_2$ per liter of solution are 0.05–166 grams for KI and 0.03–80 grams for $I_2$.

18. A method for extracting gold as recited in claim 17 wherein the concentrations of KI and $I_2$ per liter of solution are 0.1–20 grams for KI and 0.06–10 grams for $I_2$.

19. A method for extracting gold as recited in claim 18 wherein the concentrations of KI and $I_2$ per liter of solution are 0.2–5 grams for KI and 0.1–2.5 grams for $I_2$.

20. A method for extracting gold as recited in claim 19 wherein the concentrations of KI and $I_2$ per liter of solution are 0.55–0.86 grams for KI and 0.3–0.4 grams for $I_2$.

21. A method for extracting gold as recited in claim 13, further comprising fashioning said metallic gold into a gold product.

* * * * *